US012228230B2

United States Patent
Georgeau et al.

(10) Patent No.: US 12,228,230 B2
(45) Date of Patent: Feb. 18, 2025

(54) ROOFTOP PIPE SUPPORT

(71) Applicant: Green Link Holdings, LLC, Kalamazoo, MI (US)

(72) Inventors: Phillip C. Georgeau, Kalamazoo, MI (US); Lisa Anne Mulder, Plainwell, MI (US); Daniel J. Olinger, Kalamazoo, MI (US)

(73) Assignee: Green Link Holdings, LLC, Kalamazoo, MI (US)

( * ) Notice: Subject to any disclaimer, the term of this patent is extended or adjusted under 35 U.S.C. 154(b) by 0 days.

(21) Appl. No.: 17/988,333

(22) Filed: Nov. 16, 2022

(65) Prior Publication Data

US 2023/0167923 A1 Jun. 1, 2023

Related U.S. Application Data

(60) Provisional application No. 63/284,926, filed on Dec. 1, 2021.

(51) Int. Cl.
*F16L 3/223* (2006.01)
*F16L 3/12* (2006.01)

(52) U.S. Cl.
CPC .......... *F16L 3/2235* (2013.01); *F16L 3/1218* (2013.01)

(58) Field of Classification Search
CPC .......... F16M 3/22; F16M 3/221; F16M 3/223; F16M 3/2235
See application file for complete search history.

(56) References Cited

U.S. PATENT DOCUMENTS

| | | | |
|---|---|---|---|
| 3,026,076 A | | 3/1962 | Bender |
| 3,295,805 A | * | 1/1967 | Girard .................. F16L 3/227 248/68.1 |
| 4,502,653 A | * | 3/1985 | Curtis, Jr. .............. F16L 3/18 248/74.1 |
| 4,513,934 A | * | 4/1985 | Pruyne ................ F16L 3/1218 248/65 |
| 4,775,121 A | * | 10/1988 | Carty .................. F16L 3/2235 403/381 |
| 4,799,641 A | * | 1/1989 | Koreski .............. F16L 3/2235 248/68.1 |
| 5,217,191 A | * | 6/1993 | Smith .................... F16L 3/18 248/55 |
| 5,829,718 A | | 11/1998 | Smith |

(Continued)

FOREIGN PATENT DOCUMENTS

WO WO-2018151613 A1 * 8/2018 ............ H02G 3/263

OTHER PUBLICATIONS

The Rubber Triangle Co., "Strut Supports," Web., <https://rubbertriangle.com/strut-supports.html>, Jan. 15, 2021, 11 pages.

(Continued)

*Primary Examiner* — Eret C McNichols
(74) *Attorney, Agent, or Firm* — Price Heneveld LLP (57) ABSTRACT

A support includes a base and a support structure secured to the base. The support structure is adapted to support a plurality of horizontally extending elongated items. A retainer may be positioned over the elongated items to thereby prevent removal of the elongated items from the support structure. The retainer may be movable to an open position to permit removal of the elongated items.

17 Claims, 7 Drawing Sheets

(56) References Cited

U.S. PATENT DOCUMENTS

| | | | |
|---|---|---|---|
| 5,931,423 A * | 8/1999 | Heideloff | F16L 3/2235 |
| | | | 248/219.3 |
| 5,992,802 A * | 11/1999 | Campbell | H02G 3/30 |
| | | | 248/68.1 |
| 6,241,200 B1 * | 6/2001 | Camporeale | H05K 9/0018 |
| | | | 248/68.1 |
| 6,250,591 B1 * | 6/2001 | Cunningham | F16L 3/2235 |
| | | | 248/65 |
| 6,682,025 B2 | 1/2004 | Turner et al. | |
| 6,706,969 B1 * | 3/2004 | Young | H02G 3/30 |
| | | | 174/99 R |
| 6,791,841 B1 * | 9/2004 | Tirrell | H05K 5/0247 |
| | | | 361/725 |
| 7,168,210 B2 * | 1/2007 | Krovats | H01Q 1/12 |
| | | | 52/703 |
| 7,172,162 B2 * | 2/2007 | Mizukoshi | B60H 1/00557 |
| | | | 248/65 |
| 7,731,131 B2 | 6/2010 | Trueb | |
| 8,181,916 B2 | 5/2012 | Azuma et al. | |
| 8,294,030 B2 * | 10/2012 | Pollard, Jr. | H02G 3/24 |
| | | | 174/72 A |
| 8,356,778 B2 | 1/2013 | Birli et al. | |
| 8,695,929 B2 * | 4/2014 | Cox | H02G 3/0493 |
| | | | 248/68.1 |
| 9,038,967 B2 * | 5/2015 | Struck | F16L 57/04 |
| | | | 248/74.1 |
| D738,711 S | 9/2015 | Tally | |
| D749,935 S | 2/2016 | Rook et al. | |
| D758,834 S | 6/2016 | Tally | |
| 9,431,802 B2 | 8/2016 | Anselmo | |
| 9,528,271 B2 | 12/2016 | Rook et al. | |
| 9,618,143 B2 * | 4/2017 | Noble | H02G 3/30 |
| 9,726,303 B1 * | 8/2017 | Gretz | F16L 3/00 |
| 9,869,421 B2 * | 1/2018 | Fox | F16L 59/135 |
| D810,008 S | 2/2018 | Mollison et al. | |
| 9,888,603 B1 * | 2/2018 | Vargas | H02G 3/32 |
| D824,749 S | 8/2018 | Wright et al. | |
| 10,273,694 B2 * | 4/2019 | Wright | F16L 3/00 |
| 10,302,228 B2 * | 5/2019 | Costigan | H02G 3/30 |
| 10,309,553 B1 * | 6/2019 | Schwalbe | H02G 3/32 |
| 10,612,696 B2 * | 4/2020 | Milner | F16B 2200/95 |
| 10,655,374 B2 * | 5/2020 | Fukumoto | F16L 3/237 |
| 11,092,261 B2 * | 8/2021 | Bickert | F16L 3/2235 |
| 11,189,997 B2 * | 11/2021 | Yang | B60K 7/0007 |
| 11,549,639 B2 * | 1/2023 | Georgeau | F16L 3/24 |
| 11,572,694 B2 * | 2/2023 | Ball | E04D 13/00 |
| 11,639,759 B2 * | 5/2023 | Itokazu | H02G 3/32 |
| | | | 248/68.1 |
| 11,641,095 B2 * | 5/2023 | Hüppi-Ziegler | H02G 3/0406 |
| | | | 248/68.1 |
| 11,692,610 B2 * | 7/2023 | Tsorng | F16G 11/105 |
| | | | 24/132 R |
| 11,702,842 B2 * | 7/2023 | Ball | F16L 3/22 |
| | | | 248/74.1 |
| 11,716,821 B1 * | 8/2023 | Kroger | H05K 7/1491 |
| | | | 29/825 |
| 2004/0135039 A1 * | 7/2004 | Reichert | F16L 3/223 |
| | | | 248/68.1 |
| 2005/0253033 A1 * | 11/2005 | Mizukoshi | B60H 1/00557 |
| | | | 248/229.23 |
| 2006/0131465 A1 * | 6/2006 | Lynch | F16L 3/2235 |
| | | | 248/68.1 |
| 2007/0022676 A1 | 2/2007 | Krovats | |
| 2007/0120036 A1 | 5/2007 | Olle et al. | |
| 2008/0054143 A1 | 3/2008 | Collins et al. | |
| 2010/0132979 A1 * | 6/2010 | Chen | H02G 3/32 |
| | | | 174/135 |
| 2010/0155545 A1 | 6/2010 | Birli | |
| 2011/0154771 A1 | 6/2011 | Krovats | |
| 2011/0308046 A1 * | 12/2011 | Weiss | F16L 3/2235 |
| | | | 24/122.6 |
| 2012/0025034 A1 | 2/2012 | Turner | |
| 2012/0073237 A1 | 3/2012 | Brown | |
| 2014/0197282 A1 | 7/2014 | Turner | |
| 2014/0332641 A1 | 11/2014 | Wilson et al. | |
| 2015/0144746 A1 * | 5/2015 | Stewart | A61M 5/1418 |
| | | | 29/428 |
| 2015/0192225 A1 * | 7/2015 | Vo | B23P 19/04 |
| | | | 29/466 |
| 2019/0137010 A1 | 5/2019 | Bourne et al. | |
| 2019/0145551 A1 * | 5/2019 | Schwalbe | F16L 3/1091 |
| | | | 248/67.5 |
| 2021/0095791 A1 * | 4/2021 | Jokinen | F16L 3/18 |
| 2021/0148118 A1 | 5/2021 | Ball et al. | |
| 2021/0262234 A1 | 8/2021 | Ball et al. | |
| 2022/0099220 A1 * | 3/2022 | Georgeau | F16L 3/227 |
| 2022/0118585 A1 * | 4/2022 | de Lint | F16L 3/1016 |
| 2022/0373103 A1 * | 11/2022 | Austin | F16L 3/221 |
| 2023/0248460 A1 * | 8/2023 | Millward | A61B 50/24 |
| | | | 248/74.1 |

OTHER PUBLICATIONS

Mapa Products, Rooftop Support Systems, "A-Strut Supports," Web, <https://www.mapaproducts.com/products/Mapa_A-Strut_Supports_for_Plumbing_Mechanical_Piping>, Mar. 4, 2022, 2 pages.

"Mapa A-Strut Rooftop Pipe Support," YouTube, uploaded by WCMind, <https://www.youtube.com/watch?v=nwHldUt5JAc>, Jan. 8, 2021 2 pages.

* cited by examiner

ROOFTOP PIPE SUPPORT

CROSS-REFERENCE TO RELATED APPLICATION

This application claims the benefit under 35 U.S.C. § 119(e) to U.S. Provisional Patent Application No. 63/284,926, filed Dec. 1, 2021, entitled "ROOFTOP PIPE SUPPORT," which is incorporated herein by reference in its entirety.

BACKGROUND

Various items such as pipes, wires, tubing, HVAC units, and the like, may be supported on low slope roof buildings. Various efforts have been made to support such items.

SUMMARY

An aspect of the present disclosure is a support assembly for supporting one or more items on a low slope roof structure of a building. The items optionally comprise pipes or other elongated rigid items. The support assembly includes a base having a lower portion that is configured to engage a low slope roof structure of a building, and an upper connecting structure. A support structure is secured to the upper connecting structure of the base. The support structure includes a plurality of upwardly-opening recesses, wherein the recesses are designed and shaped to receive and support a plurality of elongated items. The support assembly further includes a retainer extending over the upwardly-opening recesses when the retainer is in a first or closed position. When the retainer is in the closed position, it substantially prevents upward movement and/or removal of elongated items positioned in the upwardly-opening recesses. The retainer is movable to a second or open position that permits upward movement of the elongated items out of the upwardly-opening recesses.

The retainer may be movably interconnected with the support structure. The retainer may be pivotally interconnected to the support structure for rotation about an upright pivot axis relative to the support structure.

The retainer may comprise a strap member having an opening through a first end, and another opening or a slot at a second end that opens to a side of the strap. The support assembly may further include a first connector extending through the opening to rotatably connect the strap member to the support structure for movement between the first (closed) position and the second (open) position. The support assembly may further include a second connector extending through the opening or slot, wherein the second connector selectively retains the strap member in the first (closed) position to prevent removal of elongated items.

These and other features, advantages, and objects of the present device will be further understood and appreciated by those skilled in the art upon studying the following specification, claims, and appended drawings.

DETAILED DESCRIPTION OF EMBODIMENTS

Figure 1:
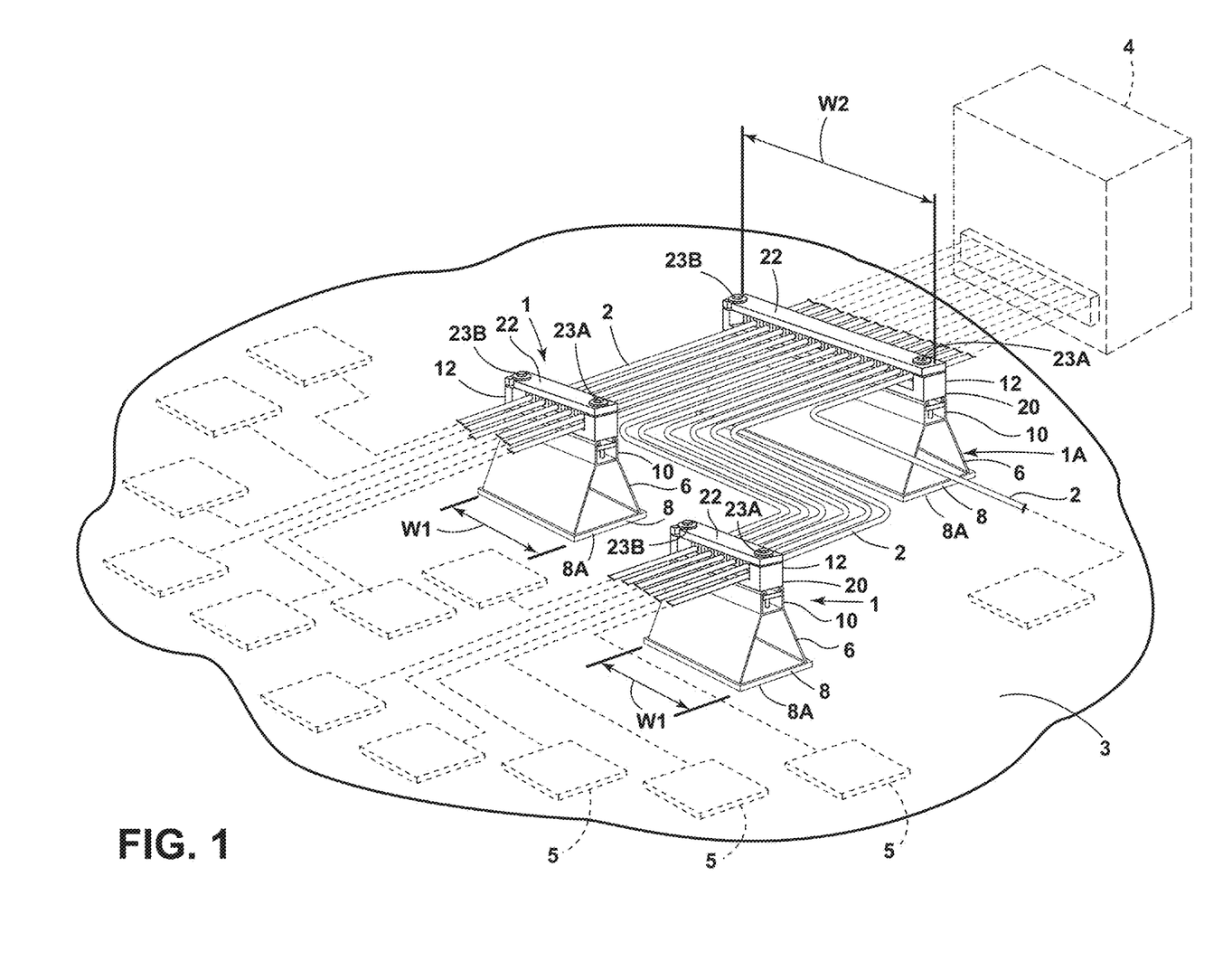
FIG. 1 is a partially fragmentary isometric view of a roof structure including a plurality of support assemblies according to an aspect of the present disclosure.

For purposes of description herein the terms "upper," "lower," "right," "left," "rear," "front," "vertical," "horizontal," and derivatives thereof shall relate to the items as oriented in FIG. 1. However, it is to be understood that the items may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, one or more support assemblies 1 and/or 1A may be utilized to support a plurality of items 2 on a low slope roof structure 3. The items 2 may comprise elongated pipes that fluidly interconnect a first unit 4 to one or more second units 5. The first unit 4 may comprise, for example, an HVAC unit or the like that may be operably interconnected to the second units 5 by pipes 2. In the illustrated example, the units 4 and 5 may comprise components of a HVAC system whereby liquid or gas (e.g., hydrogen) is supplied to the second units 5 from the first unit 4. For example, the first unit 4 may optionally comprise a tank or the like, and the second units 5 may optionally comprise fuel cells that receive liquid or gas from first unit 4 via pipes 2.

Support assemblies according to the present disclosure may have virtually any size as required for a particular application. For example, support assemblies 1 may have a width "W1" to support a first number of pipes 2 (e.g., 6 pipes). Support assembly 1A may have a width "W2" to support a larger number of pipes 2 (e.g., 12 or 13 pipes).

Support assembly 1 includes a base 6 having a lower portion 8 that is configured to engage low roof structure 3 of a building. An optional polymer pad or layer 8A may optionally be disposed on lower portion 8 if required for a particular application (e.g., a particular low roof structure 3). The support assemblies 1 and 1A may, optionally, be adhesively secured to the roof structure 3. Alternatively, the support assemblies 1, 1A may be secured to roof structure 3 utilizing mechanical fasteners (not shown) or other suitable fasteners. However, the support assemblies 1, 1A may also rest on roof structure 3 without attachment thereto.

Figure 2:
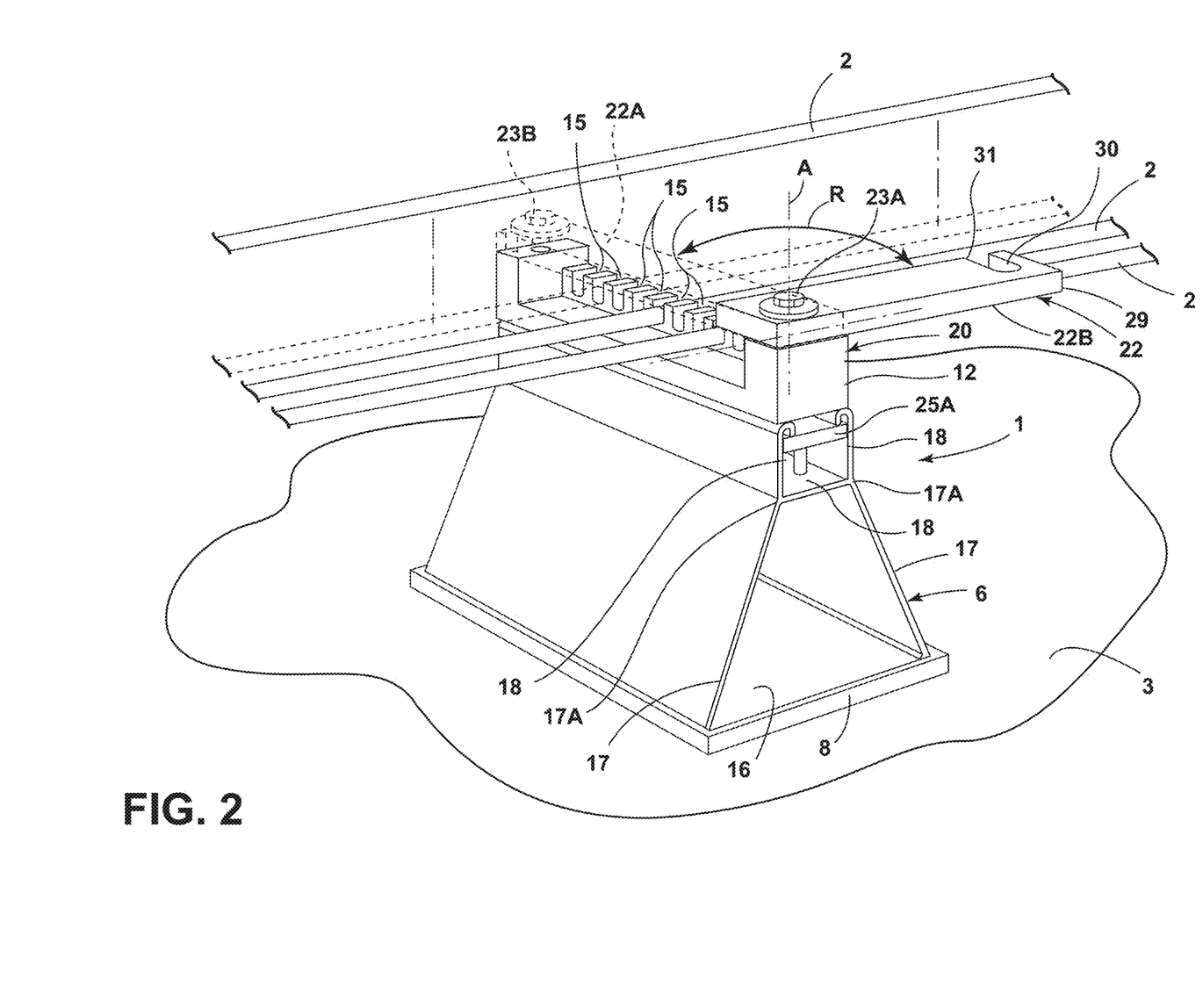
FIG. 2 is a partially fragmentary isometric view of a support assembly according to an aspect of the present disclosure.
Figure 2A:
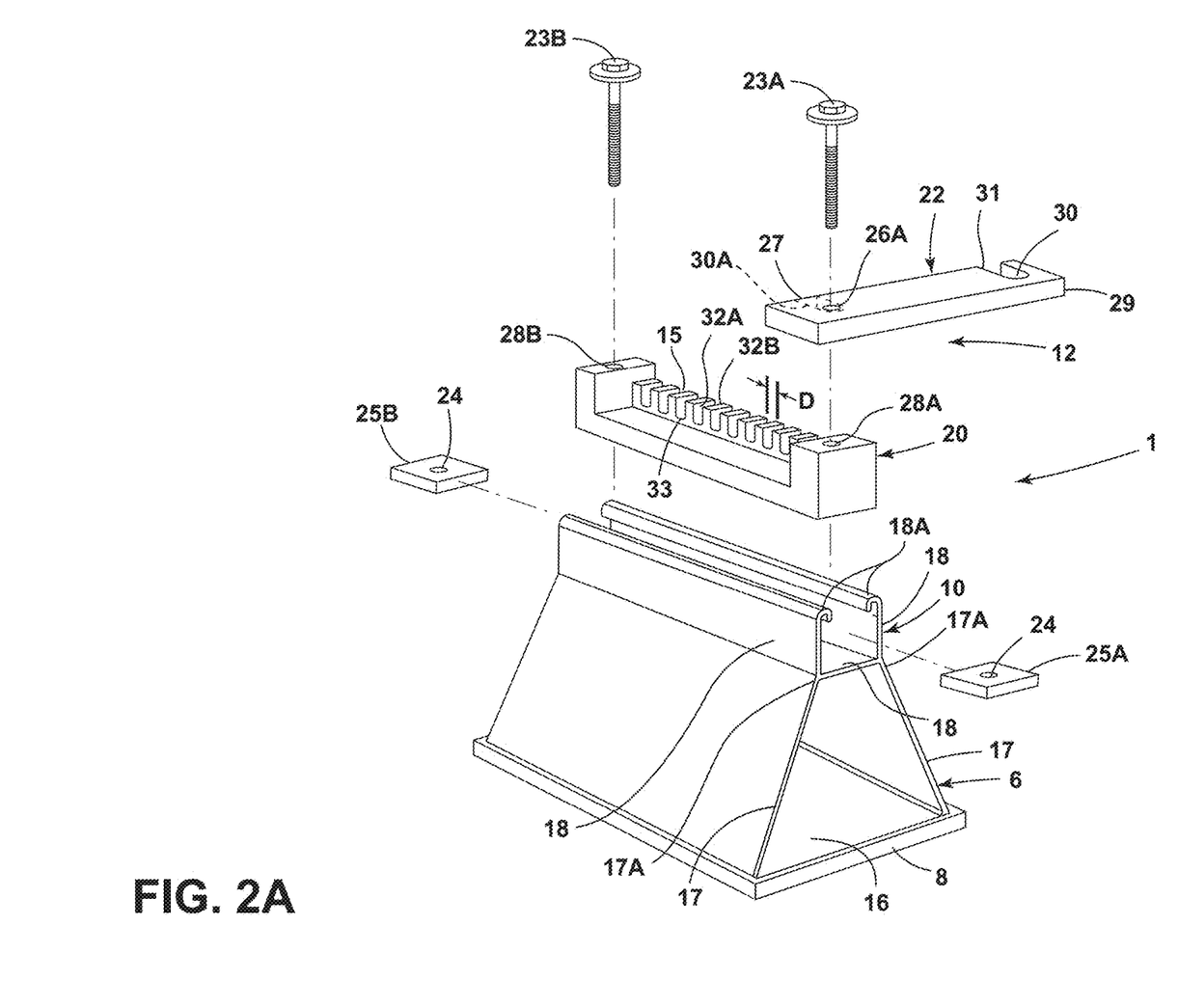
FIG. 2A is an exploded isometric view of the support assembly of FIG. 2.

The base 6 may optionally include an upper connecting structure 10. A support structure 12 may optionally be secured to the upper connecting structure 10 of the base 6. The support structure 12 may optionally include a plurality of upwardly-opening recesses 15 (see also FIGS. 2 and 2A)

that are designed and shaped to receive and support a plurality of elongated items such as pipes 2.

With reference to FIGS. 2 and 2A, base 6 may optionally comprise an extruded aluminum member including a base wall 16, angled main sidewalls 17, and an upper wall 18 extending between interconnecting upper portions 17A of main sidewalls 17. The upper connecting structure 10 may optionally comprise an elongated strut channel having spaced apart upright strut sidewalls 18, each sidewall 18 including an upper edge portion 18A having an upside down J-shape in cross section (or end view). The sidewalls 18 of upper connecting structure 10 may optionally have a geometry that is substantially similar to existing strut channels. For example, the connecting structure 10 may comprise a 1⅝" strut channel, or it could comprise a 13/16"×1⅝" strut channel, or other suitable strut channel or connector.

Referring again to FIGS. 2 and 2A, support structure 12 may optionally comprise a first or lower member 20 and a second or upper member 22 that may be in the form of a strap. When assembled, threaded fasteners such as bolts 23A and 23B threadably engage openings 24 of channel nuts 25 to secure the lower member 20 and strap 22 to the connecting structure 10 of base 6. Specifically, a first bolt 23 extends through openings 26A and 28A at a first end 27 of strap 22, and through an opening 28 of lower member 20 and engages threaded opening 24 of a first channel nut 25A. Strap 22 includes a slot 30 that has a side opening 31 at the second end of strap 22. First member 20 and strap 22 may comprise polymer or other suitable material. First member 20 and strap 22 may be substantially rigid, or they may be at least somewhat flexible.

In use, the first bolt 23 may be inserted through the opening 26A in strap 22, through opening 28A of lower member 20, and into engagement with threaded opening 24 of channel 25A. First bolt 23 may be initially somewhat loose to permit the strap 22 to rotate about an upright axis "A" (FIG. 2) between first and second positions 22A and 22B, respectively, as shown by the arrow "R." When the strap 22 is in an open position (e.g., position 22B), one or more items such as pipes 2 can be inserted or removed from the upwardly-opening recesses 15. Recesses 15 may have spaced apart side surfaces 32A and 32B that extend upwardly from a radiused lower surface 33. Typically, a distance "D" between the side surfaces 32A and 32B is about the same dimension as a diameter of the pipes 2, or slightly larger (e.g., 1/32 inch, 1/16 inch, ⅛ inch, etc.) to provide clearance if required to permit insertion and/or removal of pipes 2. All recesses 15 may have substantially the same size and shape, or the recesses may have different sizes and/or shapes (e.g., to support pipes of different sizes in a given support 1).

During installation of pipes 2, a plurality of the pipes 2 may be positioned in the upwardly-opening recesses 15 when the strap 22 is in an open position (e.g., position 22A; FIG. 2) while fastener 23A loosely engages channel 25A. After the pipes 2 are positioned in recesses 15, strap 22 is then rotated from an open position (e.g. 22A) to a closed position (e.g. 22B), and second fastener 23B is positioned in slot 30 at second end 29 of strap 22. Second fastener 23B may be loosely engaged with channel nut 25B prior to rotation of strap 22 to the position 22B, whereby threaded fastener 23B enters opening 31 of slot 30 as strap 22 rotates. When the strap 22 is in a closed position 22B, fasteners 23A and 23B may be tightened to secure strap 22 relative to member 20, thereby substantially prevent removal of pipes 2 from the support assembly 1. Fasteners 23A and 23B also secure strap 22 and member 20 to connecting structure 10 of the base 6.

To remove one or more of the pipes 2, the fasteners 23A and 23B may be loosened, strap 22 may be rotated to an open position 22A, and one or more pipes 2 may then be removed. Strap 22 may then be rotated back to closed position 22B, and threaded fasteners 23A and 23B may then be retightened to secure strap 22 in the closed position to prevent removal of pipes 2.

It will be understood that strap 22 does not necessarily need to be movably interconnected with lower member 20. For example, strap 22 could include a first slot 30 and a second slot 30A (FIG. 2A), wherein second slot 30A is utilized instead of opening 26A. In this example, bolts 23A and 23B may be loosened, and strap 22 may be removed from lower member 20 to permit pipes 2 to be positioned in recesses 15. Strap 22 may then be positioned on lower member 20 with bolts 23A and 23B positioned in slots 30 and 30A, and bolts 23A and 23B may then be tightened to secure strap 22 to lower member 20.

As noted above, base 6 may comprise an extruded aluminum member. The extruded aluminum portion of base 6 may be similar to the extrusion disclosed in U.S. patent application Ser. No. 17/300,307, filed on Sep. 30, 2020, entitled "PIPE SUPPORT." The entire contents of U.S. patent application Ser. No. 17/300,307 are incorporated herein by reference. First and second members 20 and 22 may comprise virtually any suitable material. For example, members 20 and 22 may comprise a rigid or semi-rigid polymer material. However, the present disclosure is not limited to any particular material with regards to the components of the support assembly 1, and any suitable materials may be utilized as required for a particular application.

Referring again to FIG. 1, the support assembly may have virtually any size. For example, a support assembly 1A may have a dimension W2 that is significantly greater than dimension W1 of supports 1 to thereby support a larger number of pipes 2. The strap 22 and other components of support assembly 1A may have larger dimensions than in support 1, but may operate in substantially the same manner as described above in connection with FIGS. 2 and 2A.

Figure 3:
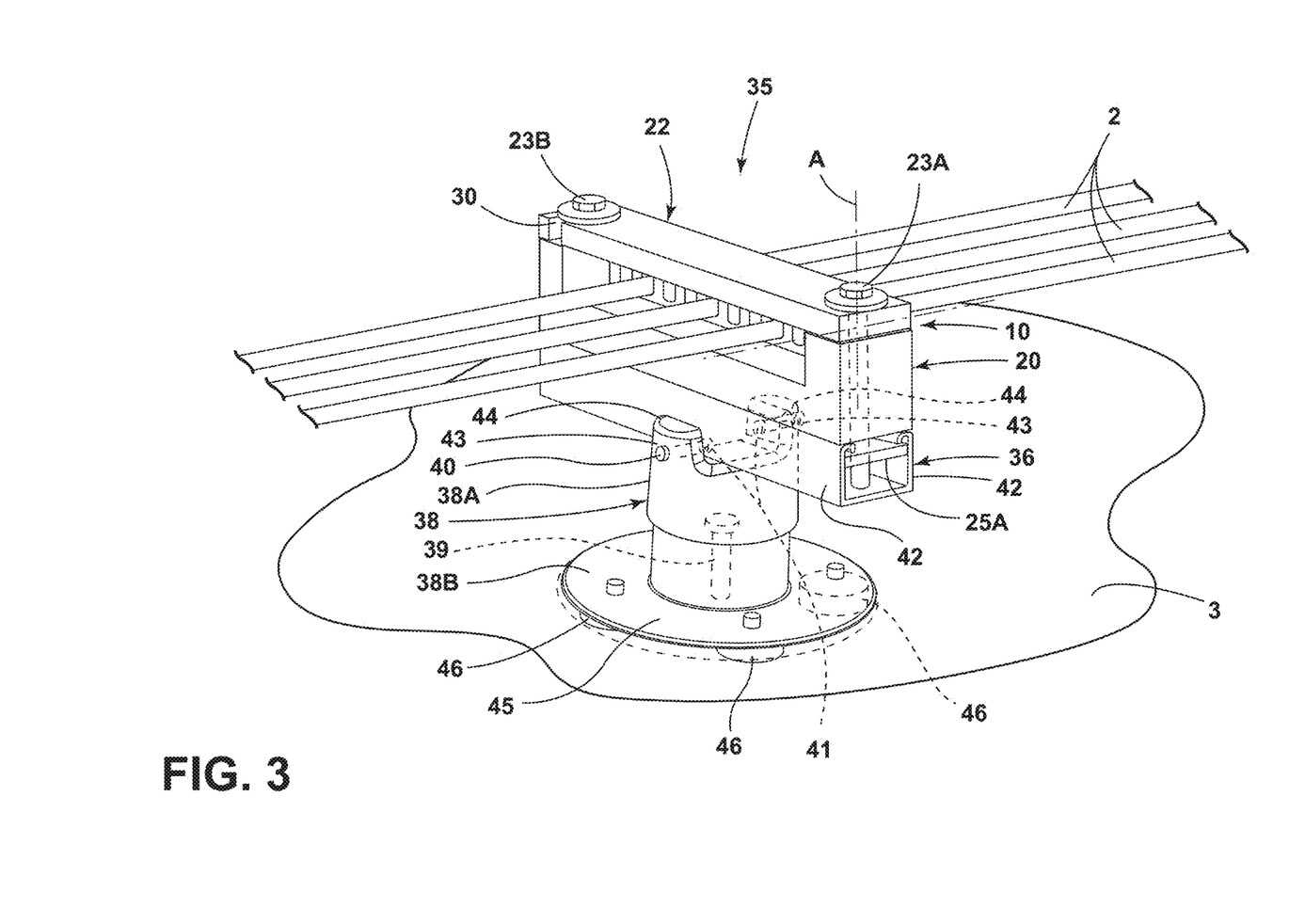
FIG. 3 is a partially fragmentary isometric view of a support assembly according to another aspect of the present disclosure.

With further reference to FIG. 3, a support assembly 35 according to another aspect of the present disclosure may include an upper connecting structure 10 having first and second members 20 and 22 that are substantially the same as described above in connection with FIGS. 2 and 2A. The support assembly 35 may include a strut channel 36 that is received in an upwardly-opening recess 37 of a base 38. Strut channel 36 may comprise a metal structure that is substantially identical to known strut channels. The strut channel 36 may be secured to base 38 by a threaded fastener such as bolt 40 that passes through openings 41 in sidewalls 42 of strut channel 36 and through openings 43 in upright portions 44 of base 38. Strut channel 36 may also be adhesively bonded to base 38. In general, adhesives and threaded fasteners may be utilized in combination to secure strut channel 36 to base 38. Alternatively, only threaded fasteners or only adhesives may be utilized to secure strut channel 36 to base 38.

Base 38 may include an upper portion 38A that is adjustably interconnected with lower portion 38B by a threaded fastener 39 to permit vertical height adjustment of upper portion 38A relative to lower portion 38B. Lower portion 45 of base 38 may be substantially disk-shaped, and may be adhesively secured to roof structure 3, or it may rest on roof structure 3 without being physically attached thereto. Alternatively, lower portion 45 may optionally include a plurality of magnets 46 to magnetically interconnect base 38 with roof structure 3 if roof structure 3 includes a suitable metal or other magnetic material.

Figure 4:
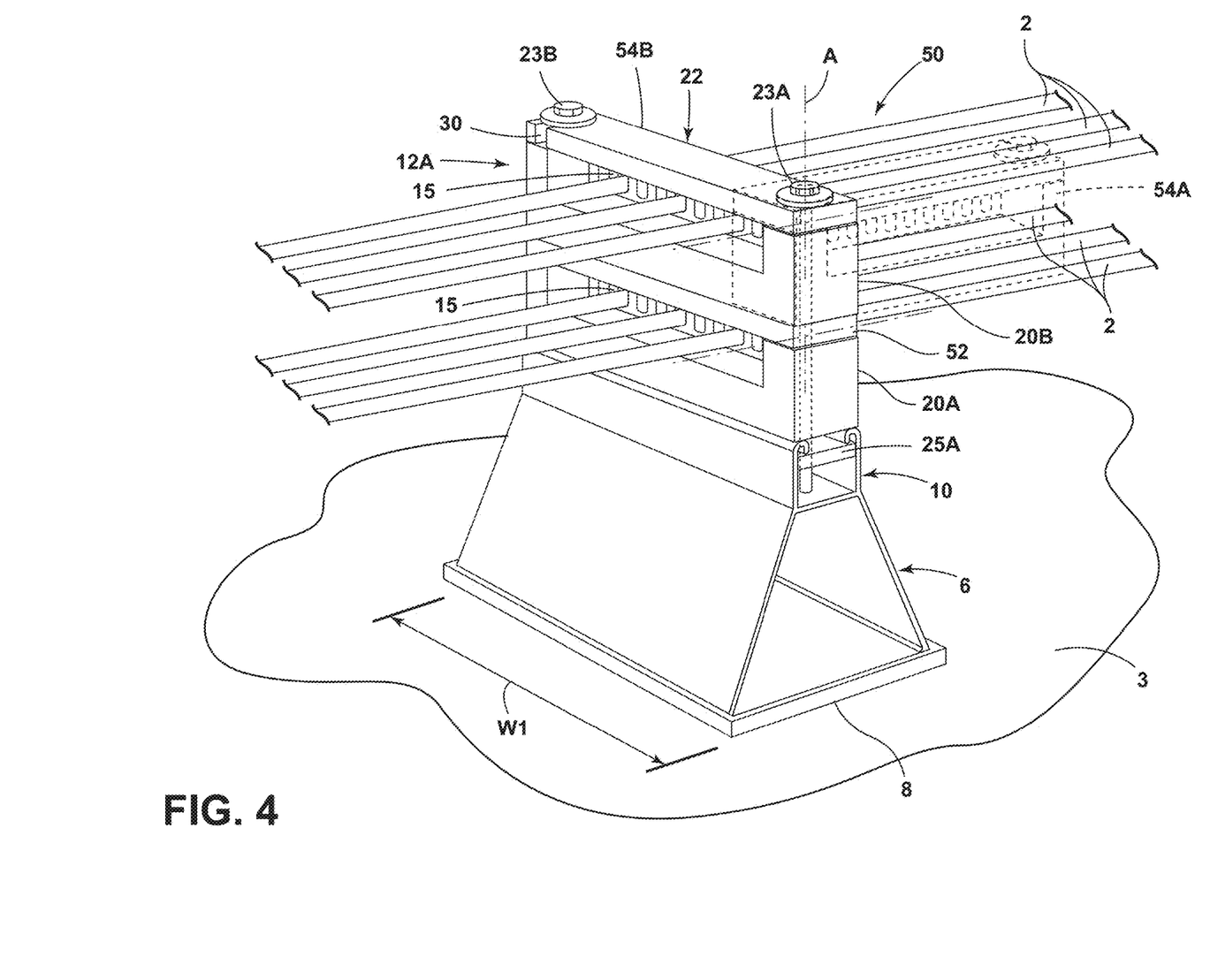
FIG. 4 is a partially fragmentary isometric view of a support assembly according to another aspect of the present disclosure.

With further reference to FIG. 4, a support assembly 50 according to another aspect of the present disclosure may include a base 6 that is substantially similar to the base 6 described in more detail above in connection with FIGS. 2 and 2A. The support assembly 50 includes first and second members 20A and 20B, each of which may be substantially identical to the lower member 20 described in more detail above in connection with FIGS. 2 and 2A. The lower members 20A and 20B may be positioned (stacked) directly on top of one another. Alternatively, an optional second strap 52 may be positioned between the members 20A and 20B. Second strap 52 may be substantially identical to strap 22 as described in more detail above in connection with FIGS. 2 and 2A. The support assembly 50 permits a plurality of pipes 2 to be positioned at different levels directly above one another, whereby a base 6 having a width W1 may support a larger number of pipes 2 if required for a particular application.

In use, pipes 2 may be positioned in member 20A by rotating upper member 20B about upright axis A, and optional strap 52 may also be rotated. When the upper member 20B, strap 22, and strap 52 are in an open position 54A, pipes 2 may be positioned in recesses 15 of support 20A, and the upper member 20B, strap 22, and optional strap 52 may then be rotated back to a closed position 54B. Upper strap 22 may be pivoted between open and closed positions to permit installation of pipes 2 in recesses 15 as described in more detail above in connection with FIGS. 2 and 2A.

Figure 5:
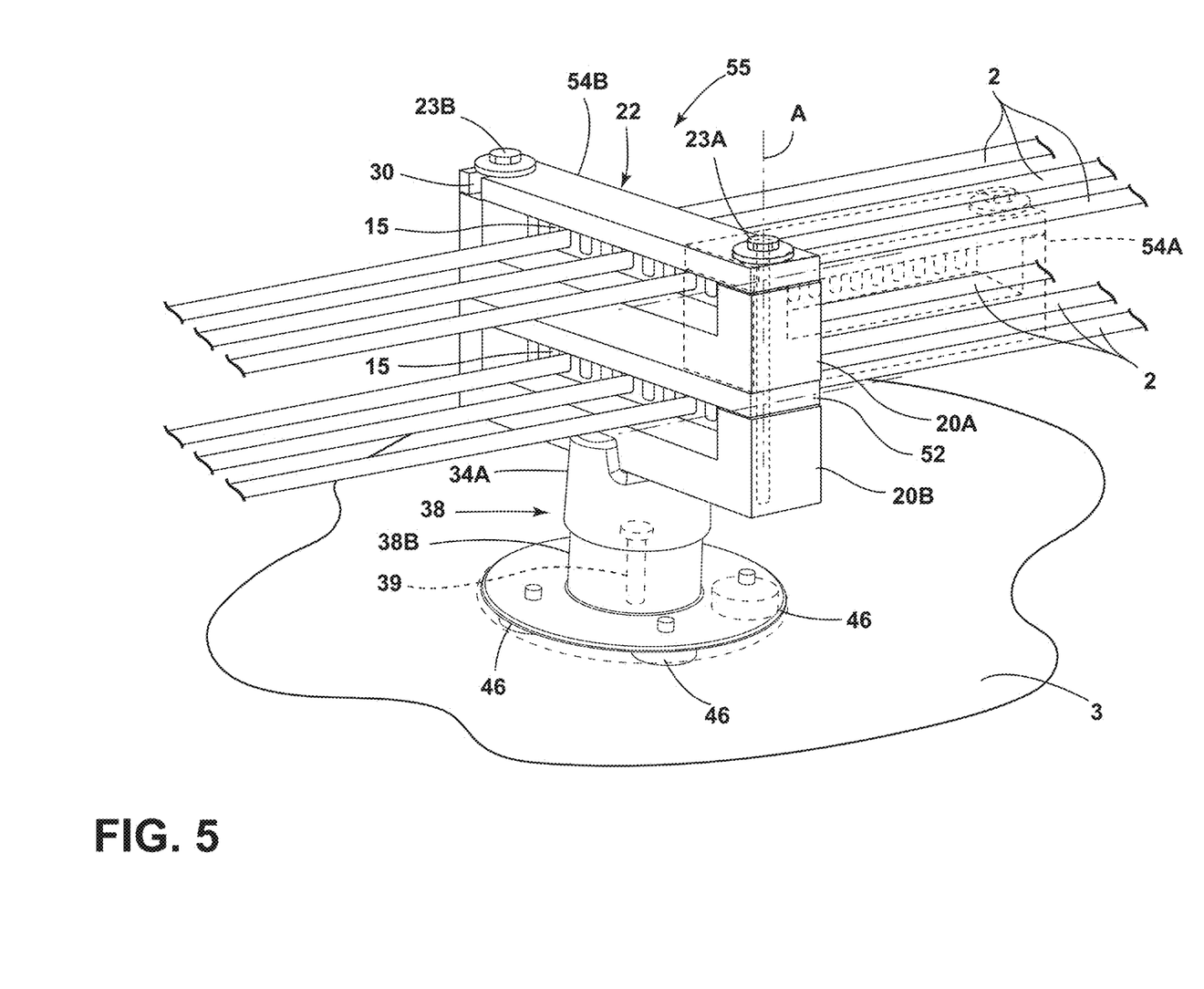
FIG. 5 is a partially fragmentary isometric view of a support assembly according to another aspect of the present disclosure.

With further reference to FIG. 5, a support 55 according to another aspect of the present disclosure may include a base 38 that is substantially similar to the base 38 described in more detail above in connection with FIG. 3. The support 55 further includes members 20A and 20B, and optional strap 52 that may be substantially the same as the corresponding components described in more detail above in connection with FIG. 4. Base 38 may be secured to a roof structure 3 as described above in connection with FIG. 3, and pipes may be installed and removed in recesses 15 as described in more detail above in connection with FIG. 4.

It will be understood that the sidewardly-opening slot 30 of straps 22 and 52 is optional. For example, straps 22 and/or 52 may include a second opening at second end 29 instead of slot 30. The opening may be substantially similar to opening 26A (FIG. 2A) and one of fasteners 23A and 23B can be removed to permit rotation of strap 22 between open and closed positions.

Figure 6:
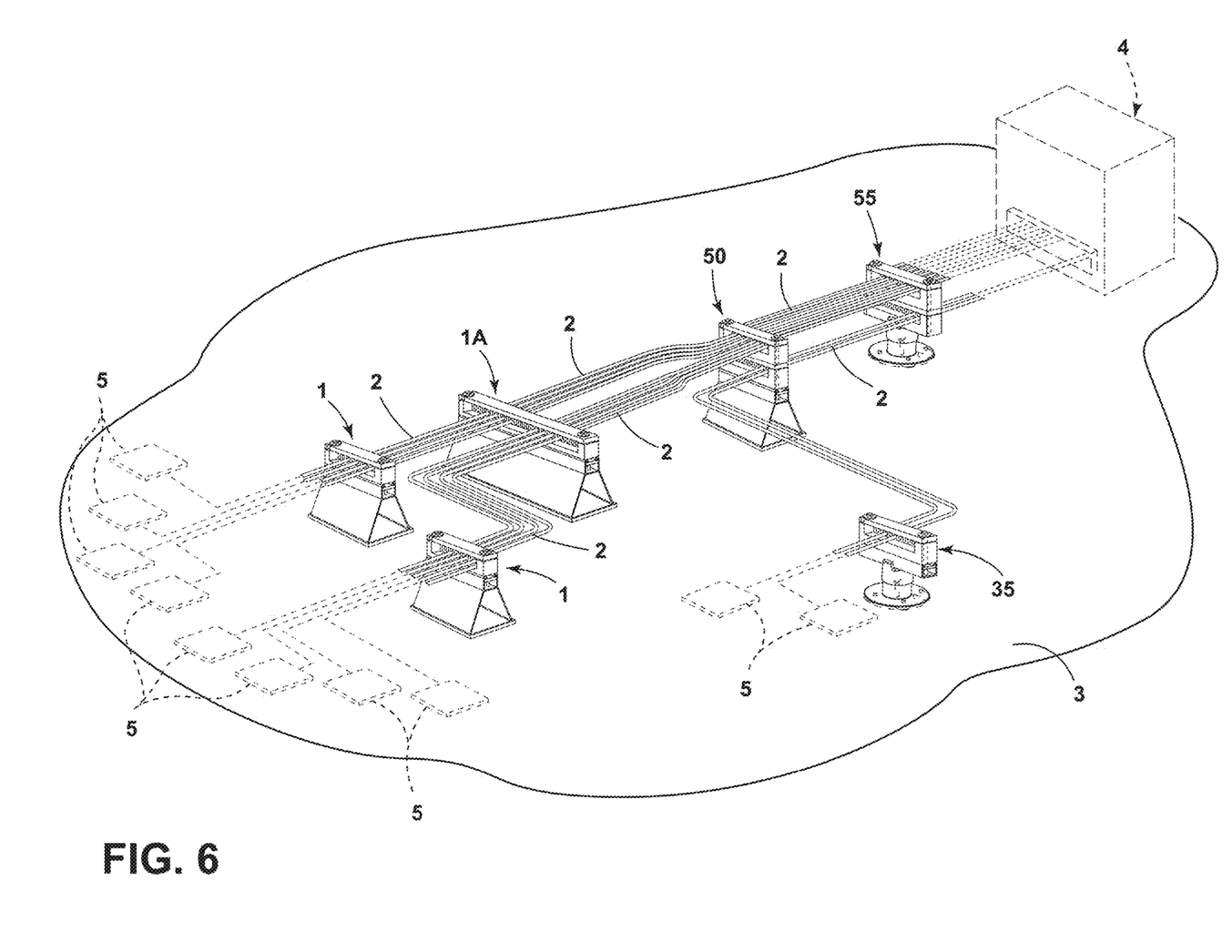
FIG. 6 is a partially fragmentary isometric view showing a plurality of support assemblies according to another aspect of the present disclosure.

With further reference to FIG. 6, one or more of the support assemblies 1, 1A, 35, 50, 55 may be utilized in combination if required for a particular application. Accordingly, the various aspects of the present disclosure as described in more detail above in connection with FIGS. 1-5 are not mutually exclusive, but rather can be used together in any combination, unless such combination is specifically described as not being possible herein.

Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A roof structure of a building, comprising:
a low slope roof structure having an upwardly facing roof surface;
a support assembly including a base, a support structure, and a retainer;
the base having a lower portion engaging the upwardly facing roof surface, wherein the base further includes an upper connecting structure;
wherein the support structure is secured to the upper connecting structure of the base, the support structure including a plurality of upwardly-opening recesses, wherein the recesses are designed and shaped to receive and support a plurality of elongated items, and wherein each recess includes a lower surface and spaced apart side surfaces that extend upwardly from the lower surface, whereby the side surfaces are orthogonal to a low slope roof structure when the base is positioned on a low slope roof structure; and
wherein the retainer is adapted to movably engage the support structure and extend over the upwardly-opening recesses when the retainer is in a closed position whereby the retainer substantially prevents removal of elongated items when elongated items are positioned in the upwardly-opening recesses, and wherein the retainer is adapted to be moved to a closed position from an open position while the retainer engages the support structure, wherein the open position permits installation and/or removal of the elongated items from the upwardly-opening recesses.

2. The roof structure of claim 1, wherein:
adjacent recesses form upwardly-extending dividers therebetween, each upwardly-extending divider having an upper end surface;
a lower surface of the retainer is spaced apart from the upper end surfaces of the dividers when the retainer is in the closed position.

3. The roof structure of claim 1, wherein:
the retainer is pivotably interconnected to the support structure for rotation about an upright pivot axis relative to the support structure.

4. The roof structure of claim 3, wherein:
the support structure includes first and second openings;
the retainer comprises a strap member having an opening through a first end, and a slot at a second end that opens to a side of the strap; and including:
a first connector extending through the opening in the strap and through the first opening of the support structure to rotatably connect the strap member to the support structure for movement between the open position and the closed position; and
a second connector extending through the slot in the strap and through the second opening of the support structure, wherein the second connector selectively retains the elongated member in the closed position to prevent removal of elongated items, and wherein:
the first and second connectors engage the base to secure the support structure and the strap to the base.

5. The roof structure of claim 1, wherein:
the retainer includes a flat lower surface extending over the upwardly-opening recesses;
the side surfaces of the recesses are flat; and
the upper connecting structure of the base comprises an elongated strut channel having spaced-apart upright strut sidewalls, each strut sidewall including an upper edge portion having an upside down J-shape in cross section.

6. The roof structure of claim 5, wherein:
the base comprises a unitary aluminum extrusion having a horizontal lower wall, spaced-apart main sidewalls extending upwardly and inwardly from the horizontal lower wall, and an upper wall extending between and interconnecting upper portions of the main sidewalls, and wherein the strut sidewalls extend upwardly above the upper wall to form the elongated strut channel.

7. The roof structure of claim 1, wherein:
the support structure comprises an upper support structure; and including:
a lower support structure including a plurality of upwardly-opening recesses, wherein the recesses are designed and shaped to receive and support a plurality of elongated items, wherein the lower support structure is positioned directly below the upper support structure to support lower elongated items in parallel with elongated items being supported by the upper support structure.

8. The roof structure of claim 7, wherein:
the retainer comprises an upper retainer that is movably connected to the upper support structure; and including:
a lower retainer sandwiched between the upper support structure and the lower support structure, wherein the lower retainer is movably connected to the lower support structure.

9. The roof structure of claim 8, wherein:
the upper support structure is substantially identical to the lower support structure;
the upper retainer is substantially identical to the lower retainer.

10. A roof structure of a building, comprising:
a low slope roof structure having an upwardly facing roof surface;
a support assembly positioned on the upwardly facing roof surface, the support assembly comprising:
a base having a lower portion engaging the upwardly facing roof surface of the low slope roof structure, wherein the base further includes an upper connecting structure;
a support structure secured to the upper connecting structure of the base, the support structure including a plurality of upwardly-opening recesses having a width and a depth, wherein the depth is at least as great as the width;
a plurality of elongated items received in the upwardly-opening recesses; and
a retainer that is adapted to extend over the upwardly-opening recesses and the elongated items when the retainer is in a closed position whereby the retainer substantially prevents removal of the elongated items, and wherein the retainer is adapted to be moved to an open position that permits removal of the elongated items from the upwardly-opening recesses.

11. The roof structure of claim 10, wherein:
the retainer comprises a rigid strap having flat upper and lower surfaces.

12. The roof structure of claim 11, wherein:
The retainer is pivotably interconnected to the support structure for rotation about an upright pivot axis relative to the support structure.

13. The roof structure of claim 10, wherein:
the upper connecting structure of the base comprises an elongated strut channel having spaced-apart upright strut sidewalls, each strut sidewall including an upper edge portion having an upside down J-shape in cross section.

14. The roof structure of claim 13, wherein:

the base comprises a unitary aluminum extrusion having a horizontal lower wall, spaced-apart main sidewalls extending upwardly and inwardly from the horizontal lower wall, and an upper wall extending between and interconnecting upper portions of the main sidewalls, and wherein the strut sidewalls extend upwardly above the upper wall to form the elongated strut channel.

15. A roof structure of a building, comprising:

a low slope roof structure having an upwardly facing roof surface;

a support assembly positioned on the upwardly facing roof surface, the support assembly comprising:

a base having a lower portion engaging the upwardly facing roof surface of the low slope roof structure, wherein the base further includes an upper connecting structure;

a support structure secured to the upper connecting structure of the base, the support structure including a plurality of upwardly-opening recesses;

a plurality of elongated items received in the upwardly-opening recesses; and a retainer that is adapted to extend over the upwardly-opening recesses and the elongated items when the retainer is in a closed position whereby the retainer substantially prevents removal of the elongated items, and wherein the retainer is adapted to be moved to an open position that permits removal of the elongated items from the upwardly-opening recesses, wherein the retainer is pivotably interconnected to the support structure for rotation about an upright pivot axis relative to the support structure, wherein the retainer comprises a strap member having an opening through a first end, and a slot at a second end that opens to a side of the strap; and including:

a first connector extending through the opening to rotatably connect the strap member to the support structure for movement between the open position and the closed position; and a second connector extending through the slot, wherein the second connector selectively retains the elongated member in the closed position to prevent removal of the elongated items.

16. A method of supporting a plurality of elongated items on a low slope roof structure of a building, the method comprising:

positioning a lower portion of a base on a low slope roof structure of a building;

securing a support structure to an upper connecting structure of the base;

positioning a plurality of elongated items in upwardly-opening recesses of the support structure while a movable retainer is in contact with the support structure in an open position relative to the support structure, wherein the retainer is movably interconnected with the support structure; and moving the retainer from the open position to a closed position in which the retainer extends over the upwardly-opening recesses whereby the retainer substantially prevents removal of the elongated items positioned in the upwardly-opening recesses;

wherein moving the retainer from the open position to the closed position includes rotating the retainer about an upright pivot axis relative to the support structure.

17. The method of claim 16, wherein:

the retainer comprises a strap member having an opening through a first end, and a slot at a second end that opens to a side of the strap and including:

causing a first connector to extend through the opening to rotatably connect the strap member to the support structure for movement between the open position and the closed position; and causing a second connector to extend through the slot;

utilizing the second connector to selectively retain the elongated member in the closed position to prevent removal of the elongated items.

\* \* \* \* \*